UNITED STATES PATENT OFFICE 2,477,346

METHYLOL-BEHENAMIDE AND RELATED COMPOUNDS

Josef Pikl, Glassboro, N. J., assignor to E. I. du Pont de Nemours & Company, Wilmington, Del., a corporation of Delaware No Drawing. Application June 28, 1946, Serial No. 680,075

3 Claims. (Cl. 260—404)

This invention relates to novel organic compounds useful as intermediates in the art of preparing water-repellency agents. More particularly, this invention deals with the N-methylol compounds of behenic-acid-amide and of docosoxy-carbamide.

It is an object of this invention to provide novel long-chain methylol-amide compounds which are useful as intermediates for preparing various organic compounds especially in the field of water-repellency agents. Other and further important objects of this invention will appear as the description proceeds.

In United States Patent No. 2,146,392, a novel series of compounds are described of the general formula R—CONH—CH$_2$—N(tert)—X and it is indicated that these compounds are useful for imparting permanent water-repellence to cellulosic textile material. In this formula, R stands for the radical of a fatty acid having at least ten carbon atoms; N(tert) designates a molecule of a tertiary base such as pyridine, its homologs, and quinoline; and X stands for the anion of a salt-forming acid. Under the specific illustrations of the above general formula are mentioned the compound derived from stearamide (R=C$_{17}$H$_{35}$), lauramide (R=C$_{11}$H$_{23}$), and oleic acid amide (R=C$_{17}$H$_{33}$).

My present invention is based on the discovery that when compounds of the above general formula are synthesized from methylol compounds having an alkyl chain of 21 to 22 carbon atoms, for instance methylol-docosoxy-carbamide.

(C$_{22}$H$_{45}$—O—CONH—CH$_2$OH)

or methylol-behenamide (C$_{21}$H$_{43}$—CONH—CH$_2$OH)

their effects upon the fiber have an outstanding permanence entirely beyond prediction on the basis of the behavior of other members of this series. For example, when methylol-behenamide is converted into behenamido-methyl-pyridinium chloride according to the process described more fully below, and then applied to the fabric in a standard manner and compared to the effect produced by stearamido-methyl-pyridinium chloride under the same conditions, it is found that a treatment bath containing 1% of the behenic acid derivative is initially as potent as a treatment bath containing 3% of the stearic acid derivative. Moreover, whereas the effect of the stearic acid derivative is "permanent" only by comparison to other known water-repellency agents, but nevertheless gradually wears off if the fabric is subjected to repeated washings, the effect produced by the behenic acid derivative was not modified to any detectable degree after ten drycleanings.

In a similar manner, the methylol derivatives of behenic-acid amide and of docosoxy carbamate may be converted into other compounds which have outstanding water-repellency qualities. As such other compounds may be named esters, such as the acetate; ethers such as the ethyl ether; and dimeric compounds of the methylene-bis-amide type, such as methylene dibehenamide.

Accordingly, my invention comprises the production of novel methylol compounds which may be characterized generically by the formula

R—CONH—CH$_2$—OH wherein R is an aliphatic radical, free from water-solubilizing groups, but containing an alkyl chain of 21 to 22 carbon atoms. Thus, in methylol-behenamide R represents the heneicosyl radical (C$_{21}$H$_{43}$—); in methylol-docosoxy carbamide, R designates the docosoxy radical (C$_{22}$H$_{45}$O—).

For this purpose I prepare the methylol derivative of behenic-acid-amide, for instance, by reacting behenic-acid-amide with formaldehyde in a basic medium or in the presence of an alkaline reacting substance, such as potassium hydroxide, sodium carbonate, pyridine, and the like. The methylol compound, which has the formula C$_{21}$H$_{43}$—CONH—CH$_2$OH, is isolated, and may be converted into one or the other of the above-named derivatives by methods which are per se known or described elsewhere. For instance, it may be converted into a quaternary compound by reaction with a salt of a tertiary amine, for instance pyridine-hydrochloride, according to the process described more fully and claimed in my copending application Serial No. 445,674, now abandoned, of which this is a continuation-in-part.

The novel methylol compounds of this invention are not stable in the presence of acid. Therefore, in their synthesis according to this invention, it is essential to select such a mode of procedure that the initial amide or the resulting methylol compound shall not come in contact with any free acid during the course of the reaction.

The reaction may be carried out in aqueous medium or in organic liquid medium such as benzene, it being understood that wherever I speak of formaldehyde, any reagent supplying formaldehyde in situ may be employed, for instance, trioxy-methylene, paraformaldehyde, or 40% aqueous formaldehyde solution. If desired, the methylol formation may be carried out in a medium of pyridine so that afterwards only hydrogen-chloride need be added to the reaction mass to produce pyridine hydrochloride and effect the further conversion of the methylol compound into a pyridinium chloride.

In general, the details of procedure may be varied according to the old processes of the art as applied to other fatty-acid-amides and carbamates, and as illustrated in British Patents No. 498,287 and No. 497,856, or in the following United States patents: 2,146,392 of A. W. Baldwin and E. E. Walker; 2,212,654 of W. V. Wirth and R. F. Deese; and 2,291,519 of W. V. Wirth and R. F. Deese.

Without limiting my invention to any particular procedure the following examples are given to illustrate my preferred mode of operation. Parts mentioned are by weight.

*Example I*

One-hundred and two parts of behenic-acid-amide were dissolved in 1500 parts of ethyl alcohol at 70° C. and then 100 parts of formalin were added and the solution was made alkaline to phenolphthalein with sodium hydroxide. The reaction temperature was dropped to 60° C. and held there for 18 hours. The methylolamide, which precipitated as a fine powder, was filtered off, washed with alcohol and dried; it had a melting point of 121° C., and was nearly insoluble in most organic solvents.

*Example II*

Fifty parts of docosyl carbamate ($C_{22}H_{45}$—O—$CONH_2$, melting point 104° C.)

were reacted in a hydrocarbon solvent (kerosene, boiling range 100–120° C.) with 4.8 parts of paraformaldehyde and 12.6 parts of pyridine by heating for four hours at 85–95° C. The reaction mass was then cooled to room temperature and the methylol amide which separated in a crystalline form was filtered off, washed with pyridine and dried. It had a melting point of 88–91° C.

In place of pyridine in the above example, other tertiary amines or amine mixtures may be used with essentially the same results. Such amines are, for instance, picoline, quinoline or a mixture of pyridine bases; also, trimethylamine, methyl-diethylamine or polyamines like tetramethyl-ethylenediamine, or tetramethyl-methylenediamine. In lieu of the solvents or diluents named in the examples, any other convenient inert organic liquid may be employed, for instance benzene, toluene, carbon tetrachloride, cyclohexane, etc. The temperature of the reaction may vary from 60 to 100° C., or higher. In similar manner, other details of procedure may be varied within the skill of those engaged in this art.

The following additional examples illustrate the conversion of my novel methylol compounds into water-repellency agents or similar derivatives.

*Example III*

37 parts of the behenamido-methylolamide obtained in Example I were suspended in 180 parts of pyridine; 17 parts of anhydrous pyridine hydrochloride were added, and the mass was then heated to 60° C. for six hours. On cooling, behenamido-methyl-pyridinium chloride separated out and was purified by recrystallizing from methanol. This product was dissolved in warm water with the aid of a small amount of alcohol and formed a clear solution. It was applied at such a concentration that 1% of the product remained on the fiber, which was then air dried and heated for a few minutes to 150° C. The fabric acquired a strong water-repellency, and was in fact as strong as a water-repellency effect produced on a similar piece of cloth by the aid of a 3% impregnation with stearamido-methyl-pyridinium chloride.

*Example IV*

A reaction mass as obtained in Example II from 50 parts of docosyl carbamate, without isolating the crystalline methylol compound, was reacted further at 60° C. with 18 parts of pyridine hydrochloride for 4 hours. The quaternary ammonium compound which crystallized out of the reaction mass was purified by dissolving in methyl alcohol and adding acetone to the filtrate. It was readily soluble in warm water, giving a clear foaming solution. When tested for water-repellency power on cotton jean cloth against stearamido-methyl-pyridinium chloride, it was found to be twice as potent in initial effect.

*Example V*

111 parts of methylol-behenamide as prepared in Example I, were heated with 64 parts of acetic acid anhydride in the presence of 90 parts of kerosene for 5 hours at 80° C.

On cooling, the reaction mass solidified and melted, after recrystallization from benzene, at 99° C. The product was behenamido-methylene-acetate and gave very good water-repellency when applied to cotton from a warm solution in carbon tetrachloride.

*Example VI*

150 parts of methylol-behenamide were added in the course of 20 minutes to a solution of 12 parts of anhydrous hydrogen chloride in 136 g. of isopropyl alcohol at 65° C. The reaction mass was then heated for 1½ hours at 68 to 70° C. Methylene dibehenamide gradually separated out in very fine particles. It had a melting point of 145–148° C.

Emulsified in water by the aid of stearamido-methyl-pyridinium chloride or soap, it gave very good water-repellency.

*Example VII*

10 parts of methylol-behenamide were warmed with 15 parts of pyridine hydrochloride and 300 parts of ethyl alcohol for 15 minutes to 55° C. On cooling, the ethyl ether of methylol-behenamide separated, which melted at 92° C.

When methyl alcohol is used in above reaction the methyl ether is formed, which melts at 95–96° C.

In place of methyl or ethyl alcohol, glycolic acid may be used resulting in the glycolic acid ether, which is soluble in alkalies, such as ammonia or sodium carbonate.

I claim as my invention:

1. A methylol compound of the general formula

R—CONH—CH₂OH wherein R designates an aliphatic radical selected from the group consisting of heneicosyl and docosoxy.

2. N-methylol behenic-acid-amide.
3. N-methylol docosyl carbamate.

JOSEF PIKL.

(References on following page)

REFERENCES CITED

The following references are of record in the file of this patent:

UNITED STATES PATENTS

| Number | Name | Date |
|---|---|---|
| 2,125,901 | Evans et al. | Aug. 9, 1938 |
| 2,232,485 | Shipp | Feb. 18, 1941 |
| 2,426,790 | Pikl | Sept. 2, 1947 |

FOREIGN PATENTS

| Number | Country | Date |
|---|---|---|
| 471,130 | Great Britain | Aug. 27, 1937 |